United States Patent
Chang et al.

(10) Patent No.: US 10,818,946 B2
(45) Date of Patent: Oct. 27, 2020

(54) FUEL CELL SYSTEM AND METHOD FOR CONTROLLING THE SAME

(71) Applicants: Hyundai Motor Company, Seoul (KR); Kia Motors Corporation, Seoul (KR)

(72) Inventors: Sae Kwon Chang, Gyeonggi-do (KR); Hyuck Roul Kwon, Gyeonggi-do (KR); Hyun Jae Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 185 days.

(21) Appl. No.: 16/050,611

(22) Filed: Jul. 31, 2018

(65) Prior Publication Data
US 2019/0341636 A1    Nov. 7, 2019

(30) Foreign Application Priority Data
May 4, 2018    (KR) .................. 10-2018-0051927

(51) Int. Cl.
*H01M 8/04858* (2016.01)
*H01M 8/04791* (2016.01)
*H01M 8/0444* (2016.01)
*H01M 8/04302* (2016.01)

(52) U.S. Cl.
CPC ....... *H01M 8/0488* (2013.01); *H01M 8/0447* (2013.01); *H01M 8/04302* (2016.02); *H01M 8/04805* (2013.01)

(58) Field of Classification Search
CPC .......... H01M 8/0488; H01M 8/04303; H01M 8/0447; H01M 8/04805
See application file for complete search history.

(56) References Cited

U.S. PATENT DOCUMENTS

| | | | |
|---|---|---|---|
| 8,951,687 B2 * | 2/2015 | Shimoi | H01M 8/04223 429/429 |
| 9,005,827 B2 * | 4/2015 | Nedergaard Clausen | H01M 8/04238 429/410 |
| 10,270,111 B2 * | 4/2019 | Choo | H01M 8/04955 |

(Continued)

FOREIGN PATENT DOCUMENTS

| | | |
|---|---|---|
| JP | 2010182589 A | 8/2010 |
| KR | 20160027663 A | 3/2016 |
| KR | 20160056434 A | 5/2016 |

*Primary Examiner* — Amanda C. Walke
(74) *Attorney, Agent, or Firm* — Mintz Levin Cohn Ferris Glovsky and Popeo, P.C.; Peter F. Corless

(57) ABSTRACT

A fuel cell system that has a fuel cell stack is provided. The system includes an electrolyte membrane, and a cathode and an anode that are a pair of electrodes disposed on opposite sides of the electrolyte membrane. A controller applies voltages to the cathode and the anode of the fuel cell stack before hydrogen that operates the fuel cell stack is supplied to the anode. When the voltages are applied to the cathode and the anode, hydrogen that resides in the cathode flows to the anode through the electrolyte membrane to decrease the concentration of the hydrogen in the cathode. The fuel cell system reduces the concentration of hydrogen discharged to the outside of the vehicle by reducing the concentration of hydrogen in the cathode before driving of the fuel cell is initiated.

17 Claims, 8 Drawing Sheets

(56) References Cited

U.S. PATENT DOCUMENTS

| | | | |
|---|---|---|---|
| 2004/0202900 A1* | 10/2004 | Pavio | H01M 8/04447 |
| | | | 429/9 |
| 2013/0177826 A1* | 7/2013 | Harris | H01M 8/04559 |
| | | | 429/428 |
| 2016/0059884 A1 | 3/2016 | Gu | |
| 2017/0233878 A1 | 8/2017 | Yakumaru et al. | |
| 2017/0263962 A1* | 9/2017 | Koo | B01D 53/00 |
| 2019/0097241 A1* | 3/2019 | Weber | H01M 8/1004 |
| 2019/0103619 A1* | 4/2019 | Tsuge | H01M 8/04619 |

* cited by examiner

FUEL CELL SYSTEM AND METHOD FOR CONTROLLING THE SAME

CROSS-REFERENCE TO RELATED APPLICATION

This application is based on and claims the benefit of priority to Korean Patent Application No. 10-2018-0051927, filed on May 4, 2018, the disclosure of which is incorporated herein in its entirety by reference.

TECHNICAL FIELD

The present disclosure relates to a fuel cell system and a method for controlling the same, and more particularly, to a fuel cell system for reducing the concentration of hydrogen discharged from a fuel cell at an initial driving state of the fuel cell and a method for controlling the same.

BACKGROUND

A fuel cell system employs a fuel cell stack having an air electrode, an electrolyte electrode, and a pair of electrodes. During an operation of the fuel cell system, air is supplied to a cathode and hydrogen is supplied to an anode. However, when air remains in the interior of the system after the system is stopped, carbon corrosion due to oxygen in the air may occur. Accordingly, the durability of the fuel cell stack may deteriorate. Further, when an excessive amount of hydrogen remains in the interior of the system after the system is stopped, a concentration of hydrogen in the gases discharged when the system is restarted increases and thus a danger of a fire or an explosion may increase.

SUMMARY

The present disclosure provides a fuel cell system that may reduce the concentration of oxygen that remains in the interior of the system when the system is stopped and may reduce the concentration of hydrogen that is discharged during an operation of the system.

In accordance with an aspect of the present disclosure, a fuel cell system having a fuel cell stack may include an electrolyte membrane, and a cathode and an anode that are a pair of electrodes disposed on opposite sides of the electrolyte membrane, and a controller configured to adjust application of voltages to the cathode and the anode of the fuel cell stack before hydrogen that operates the fuel cell stack is supplied to the anode, when the voltages are applied to the cathode and the anode, hydrogen that resides in the cathode flows to the anode through the electrolyte membrane to decrease the concentration of the hydrogen in the cathode.

In accordance with an aspect of the present disclosure, a method for controlling a fuel cell system may include applying voltages to a cathode and an anode of a fuel cell stack to move hydrogen from the cathode to the anode, and supplying a fuel containing hydrogen to the fuel cell stack to operate the fuel cell stack.

In accordance with an aspect of the present disclosure, a fuel cell vehicle having a fuel cell stack may include an electrolyte membrane, and a cathode and an anode that are a pair of electrodes disposed on opposite sides of the electrolyte membrane, and a controller configured to adjust application of voltages to the cathode and the anode to reduce the concentration of hydrogen in the cathode before hydrogen that operates the fuel cell stack is supplied to the anode, wherein hydrogen moves from the cathode flows to the anode through the electrolyte membrane when the voltages are applied to the cathode and the anode.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
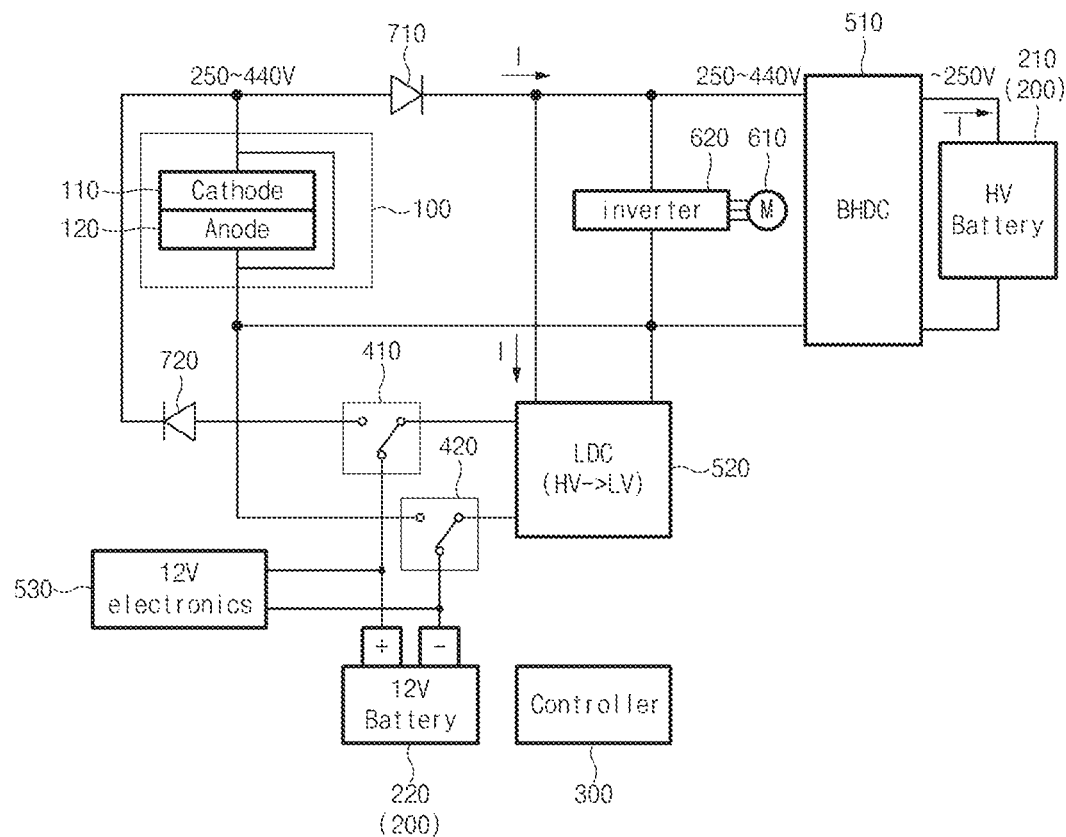
FIG. 1 is a conceptual view illustrating a fuel cell system according to a first exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

Figure 2:
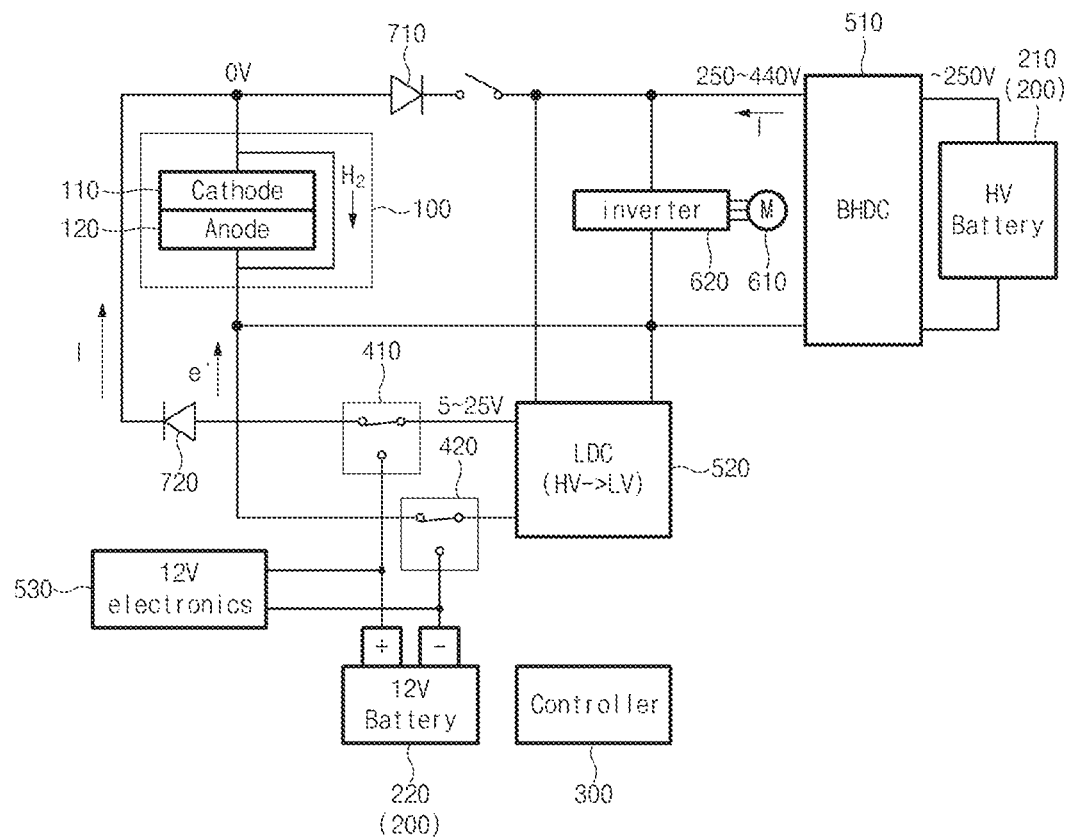
FIG. 2 is a concept view illustrating that voltages are applied to a cathode and an anode of a fuel cell stack to move hydrogen that remains in the cathode to the anode in the fuel cell system of FIG. 1 according to the first exemplary embodiment of the present disclosure.

FIG. 1 is a concept view illustrating a fuel cell system according to a first exemplary embodiment of the present disclosure. FIG. 2 is a concept view illustrating that voltages are applied to a cathode and an anode of a fuel cell stack to move hydrogen that remains in the cathode to the anode in the fuel cell system of FIG. 1.

The fuel cell system according to the present exemplary embodiment may include a fuel cell stack 100 operated by a fuel containing hydrogen, an energy storage 200 that may be charged or discharged, a controller 300, and relays 410 and 420 that interrupt connections of elements in the interior of the fuel cell system. The fuel cell stack 100 may include an electrolyte membrane (not illustrated) and a cathode 110 and an anode 120 that are a pair of electrodes disposed on opposite sides of the electrolyte membrane. During an operation of the fuel cell system, air containing oxygen may be supplied to the cathode 110 of the fuel cell stack 100, and hydrogen may be supplied to the anode 120 of the fuel cell stack 100.

When the fuel cell system is stopped, an air supply line (not illustrated) through which air is supplied to the cathode 110 and a hydrogen supply line (not illustrated) through which hydrogen is supplied to the anode 120 may be closed by valves. Further, a cathode discharge line (not illustrated) through which air or hydrogen is discharged from the cathode 110 and an anode discharge line (not illustrated) through which air or hydrogen is discharged from the anode 120 may be closed by valves. Air or hydrogen may remain within the system (e.g., within the fuel cell stack) as the lines are closed.

However, when air remains within the system, carbon corrosion due to oxygen in the air may occur. Carbon, which is widely used as a catalyst support of a membrane electrode assembly may be corroded by oxygen in an environment in an initial startup stage. Accordingly, the durability of the fuel cell stack may decrease. To prevent such a deterioration, oxygen of the cathode 110 may be removed through hydrogen of the anode 120, by operating cathode oxygen depletion (COD) when the system is stopped.

Particularly, to decrease the concentration of air that remains in the interior of the system, hydrogen may be additionally introduced into the interior of the fuel cell stack after the supply of air is stopped before the operation of the fuel cell system is stopped. However, when excessive much hydrogen remains within the system, a concentration of hydrogen in the gases discharged when the system is restarted increases and thus a danger of a fire or an explosion may increase. In a fuel cell vehicle, a concentration of hydrogen in exhaust gases may be legally regulated to a specific value or less to secure safety.

In a brief description of the concentrations of the hydrogen that resides in the anode and the cathode after the driving of the fuel cell system is stopped with reference to FIG. 7 to be described later, the hydrogen in the anode may be diffused to the cathode when a specific time elapses after the driving of the fuel cell system is stopped to adjust the concentration of hydrogen in both the electrodes to become similar. Accordingly, when the fuel cell system is operated again in a state in which the concentration of the hydrogen in the cathode is higher, the hydrogen may be discharged to the outside of the system through the discharge line connected to the cathode.

The fuel cell system according to the exemplary embodiment relates to a technology of preventing the problems due to oxygen and hydrogen remaining within the system. In particular, the fuel cell system according to the present exemplary embodiment relates to a technology of preventing the above-mentioned problems by reducing the concentration of oxygen that remains in the interior of the system when the system is stopped and reducing the concentration of hydrogen that is discharged when the system is operated. The basic feature of the fuel cell system according to the present exemplary embodiment is to reduce the concentration of hydrogen in a cathode by applying voltages to the cathode and an anode before hydrogen is supplied to operate the fuel cell system.

Hereinafter, the feature of the fuel cell system according to the present exemplary embodiment will be described in more detail. First, a state in which the fuel cell system according to the present exemplary embodiment is being operated will be described with reference to FIG. 1. When the fuel cell system is operated while hydrogen is supplied to the anode 120 and air containing oxygen is supplied to the cathode 110, electric power may be generated in the fuel cell stack 100. Then, a current exits from the cathode 110 and flows towards the anode 120.

Particularly, a bidirectional high-voltage direct current-direct current (DC-DC) converter (BHDC) 510 may be configured to adjust a voltage of an output terminal of the fuel cell to adjust the flow direction of the current between the fuel cell stack 100 and a high-voltage battery 210. For example, the BHDC 510 may allow the high-voltage battery 210 to be charged by adjusting the voltage of the output terminal of the fuel cell such that the voltage of the output terminal of the fuel cell is less than the voltage of a high voltage bus terminal between the fuel cell stack 100 and the BHDC 510. In contrast, the BHDC 510 may allow the high-voltage battery 210 to be discharged by adjusting the voltage of the output terminal of the fuel cell such that the voltage of the output terminal of the fuel cell is greater than the voltage of a high voltage bus terminal between the fuel cell stack 100 and the BHDC 510. The voltage of the high-voltage bus terminal of the BHDC 510 refers to a voltage based on power of a driving motor 610 of the fuel cell vehicle, and the voltage of the high-voltage bus terminal may decrease when the driving motor 610 requires power and may increase during regenerative braking.

The driving motor 610 may be supplied with electric power from the high-voltage battery 210 or the fuel cell stack 100 through an inverter 620. The inverter 620 may be configured to receive a control signal from the controller of the vehicle and operate the driving motor 610. A low-voltage battery 220 may be supplied with electric power from the fuel cell stack 100 through a low-voltage DC-DC converter (LDC) to thus be charged. The relays 410 and 420 may be operated by the controller 300 such that the LDC and the low-voltage battery 220 are connected to each other when the fuel cell stack 100 is operated. A plurality of diodes 710 and 720 may be connected to a plurality of points on a circuit to restrict flows of currents to one direction. Accordingly, when the fuel cell system is operated, electric power may be generated by the fuel cell stack 100 to charge the high-voltage battery 210 and the low-voltage battery 220.

Hereinafter, a process of pumping hydrogen before the fuel cell stack is operated in the fuel cell system according to the present exemplary embodiment will be described with reference to FIG. 2. To reduce the concentration of hydrogen of the cathode 110 before the operation of the fuel cell system is started, the controller 300 may be configured to supply voltages to the cathode 110 and the anode 120 of the fuel cell stack 100 by using the high-voltage battery 210.

In particular, the controller 300 may be configured to open a switch that switches connection between an output terminal of the fuel cell stack 100 and the BHDC 510, and may be configured to operate the relays 410 and 420 to connect the fuel cell stack 100 and the LDC 520 to each other. The high voltage output from the high-voltage battery 210 may be converted to a low voltage by the LDC 520, may be applied to the cathode 110 as a positive (+) voltage, and may be applied to the anode 120 as a negative (−) voltage.

The controller may be configured to supply the electric power generated while the fuel cell system is operated as in FIG. 1 to the high-voltage battery 210 and the like after voltages are applied to the cathode 110 and the anode 120 for a preset period of time. In particular, the controller 300 may be configured to close a switch that switches connection between an output terminal of the fuel cell stack 100 and the BHDC 510, and may be configured to operate the relays 410 and 420 to connect the LDC 520 and the low-voltage battery 220 to each other.

Figure 6:
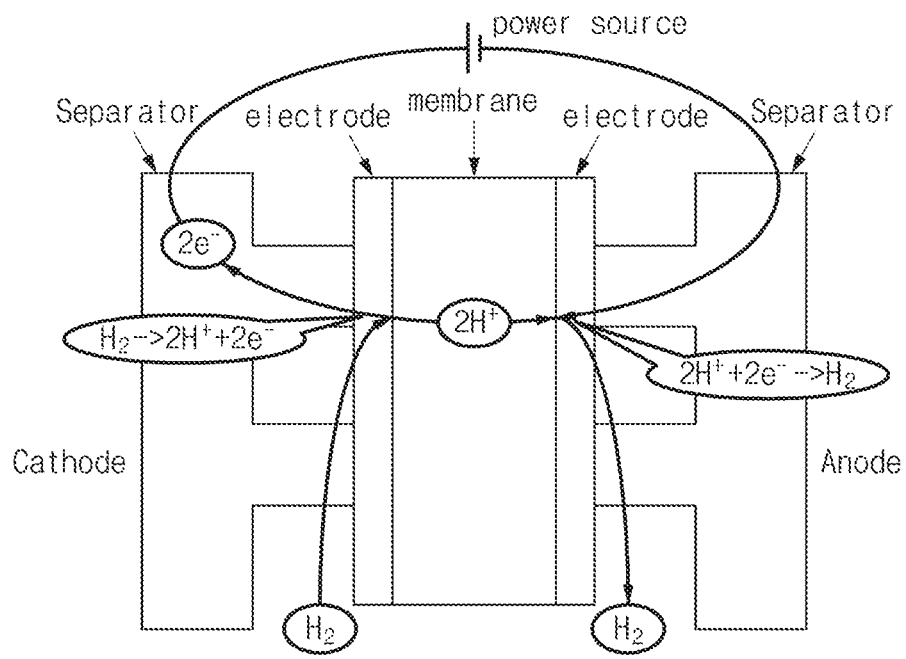
FIG. 6 is a view illustrating an operation in the fuel cell systems according to the exemplary embodiments of the present disclosure.

An operation of the interior of the fuel cell stack 100 when voltages are applied to the cathode 110 and the anode 120 as in FIG. 2 will be described with reference to FIG. 6. Electrons are retrieved from hydrogen in the cathode 110 such that the hydrogen is cationized and the hydrogen flows to the anode 120 through the electrolyte membrane. In the anode 120, the cationized hydrogen obtains electrons and hydrogen molecules are generated. Through the hydrogen pumping operation, the hydrogen in the cathode 110 flows to the anode 120 to decrease the concentration of the cathode 110. Accordingly, the safety of the vehicle may be secured by preventing hydrogen from being excessively discharged to the outside of the fuel cell system through the cathode discharge line connected to the cathode 110 at an initial driving state of the fuel cell system.

Figure 3:
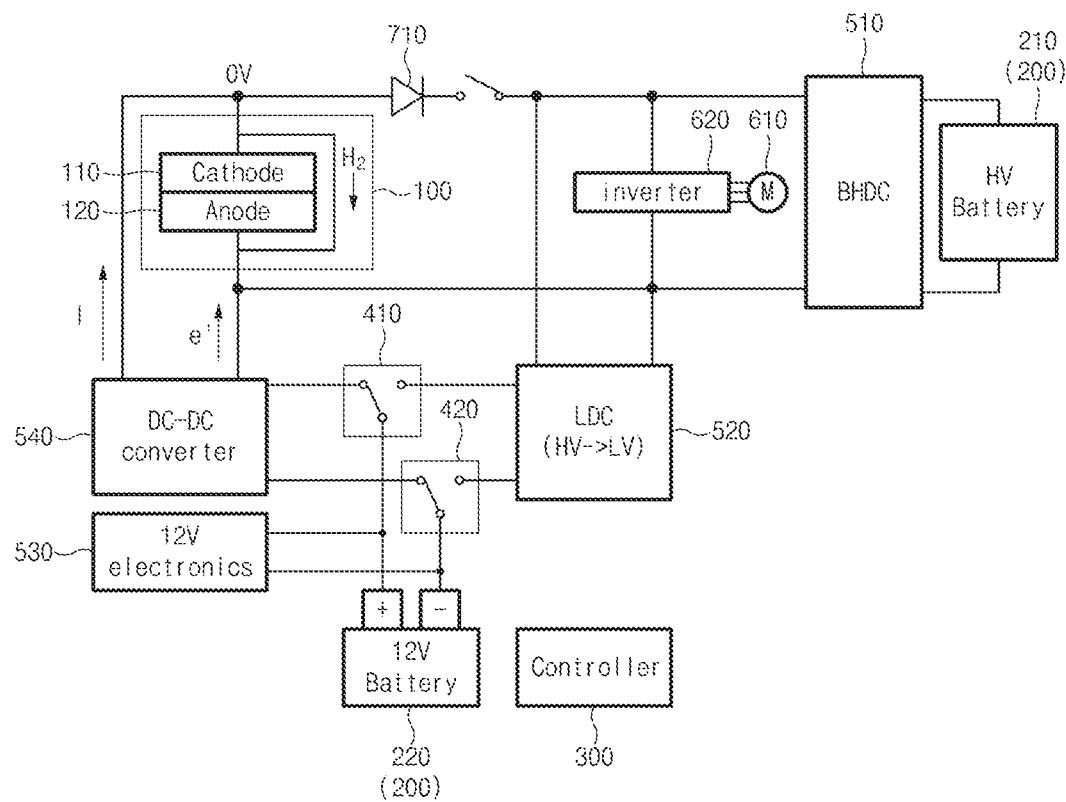
FIG. 3 is a concept view illustrating that voltages are applied to a cathode and an anode in a fuel cell system according to a second exemplary embodiment of the present disclosure.

FIG. 3 is a concept view illustrating that voltages are applied to a cathode and an anode of a fuel cell stack to move hydrogen that remains in the cathode to the anode in the fuel cell system according to a second exemplary embodiment of the present disclosure. Referring to FIG. 3, the fuel cell system according to the second exemplary embodiment of the present disclosure may further include a DC-DC converter 540 connected between the low-voltage battery 220 and the fuel cell stack 100 in addition to the elements of the fuel cell system according to the first exemplary embodiment of the present disclosure.

The controller 300 may be configured to control application of voltages to the cathode 110 and the anode 120 of the fuel cell stack 100 before hydrogen that will operate the fuel cell stack 100 is supplied to the anode 120. In particular, the controller 300 may be configured to open a switch that switches connection between an output terminal of the fuel cell stack 100 and the BHDC 510, and may be configured to operate the relays 410 and 420 to connect the low-voltage battery 220 and the DC-DC converter 540 to each other.

The high voltage output from the low-voltage battery 220 may be converted to a low voltage by the DC-DC converter 540, may be applied to the cathode 110 as a positive (+) voltage, and may be applied to the anode 120 as a negative (−) voltage. The controller may be configured to supply the electric power generated while the fuel cell system is operated to the high-voltage battery 210 and the like after voltages are applied to the cathode 110 and the anode 120 for a preset period of time. In particular, the controller 300 may be configured to close a switch that switches connection between an output terminal of the fuel cell stack 100 and the BHDC 510, and may be configured to operate the relays 410 and 420 to connect the LDC 520 and the low-voltage battery 220 to each other.

For example, maximum of the preset period of time for which voltages are applied to the cathode 110 and the anode 120 may be about 10 seconds.

When the fuel cell system according to the second exemplary embodiment is used, loss of electric power due to drop of a voltage may be reduced by applying voltages to the cathode 110 and the anode 120 of the fuel cell stack 100 by using the low-voltage battery 220 instead of the high-voltage battery 210. In other words, although the voltage has to be substantially reduced to apply the voltage supplied by the high-voltage battery 210 to the fuel cell stack 100, the voltage may be reduced by a minimal degree to apply the voltage supplied by the low-voltage battery 220 to the fuel cell stack 100.

For example, the voltage reaches as high as about 250 V in the case of the high-voltage battery 210, and the voltage may be about 12V which corresponds to an auxiliary battery of the vehicle in the case of the low-voltage battery 220. Additionally, the voltage provided by the low-voltage battery 220 may be maintained at 12 V by a 12V electric component 530. Further, the 12V electric component may be configured to measure a supply voltage of the low-voltage battery 220.

Figure 4:
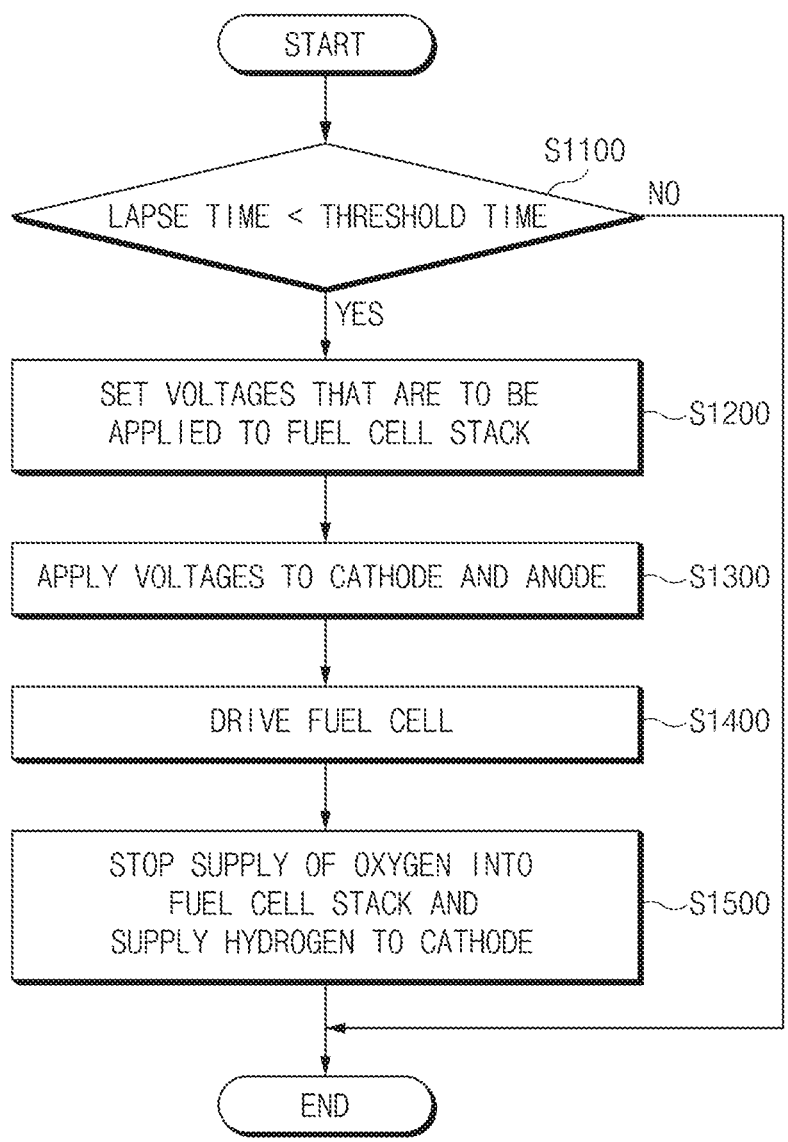
FIG. 4 is a flow chart illustrating a method for controlling a fuel cell system according to the first exemplary embodiment of the present disclosure.
Figure 5:
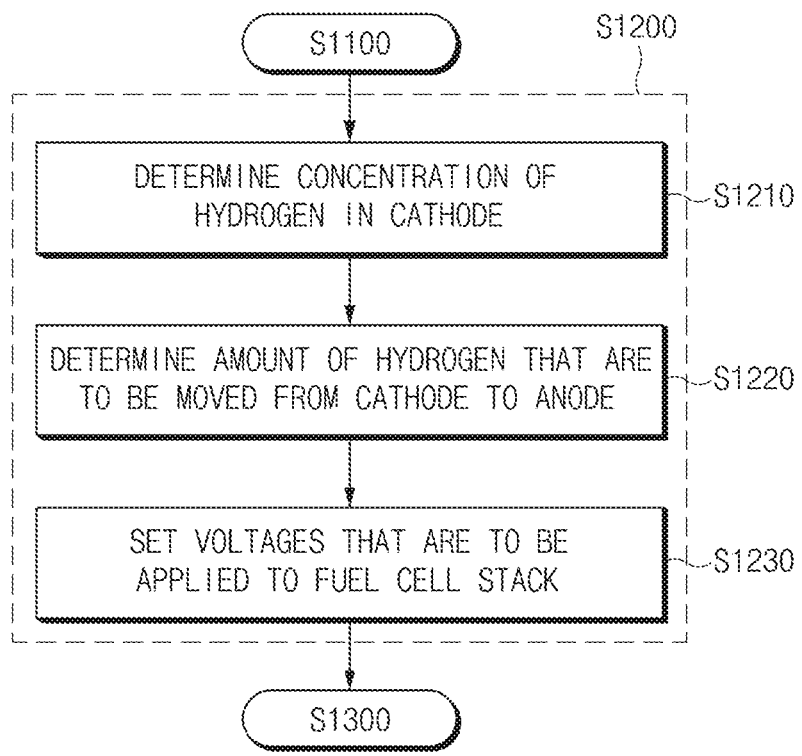
FIG. 5 is a flowchart illustrating an operation of setting voltages that are to be applied to the fuel cell stack of FIG. 4 according to the first exemplary embodiment of the present disclosure.

FIG. 4 is a flow chart illustrating a method for controlling a fuel cell system according to the first exemplary embodiment of the present disclosure. FIG. 5 is a flowchart illustrating an operation (S1200) of setting voltages that are to be applied to the fuel cell stack of FIG. 4. Hereinafter, the method for controlling a fuel cell system according to the exemplary embodiments of the present disclosure will be described in detail with reference to FIGS. 4 and 5. The methods described herein below may be executed by the controller having a memory and a processor.

Particularly, the controller 300 may be configured to determine whether voltages are to be applied to the fuel cell stack 100, based on a lapse time from a time point at which the operation of the fuel cell system is stopped to a time point at which the fuel cell system is operated again (S1100). The controller 300 may be configured to apply voltages to the fuel cell stack when the lapse time is less than a preset threshold period of time. For example, the threshold time may be about 76 hours.

Figure 7:
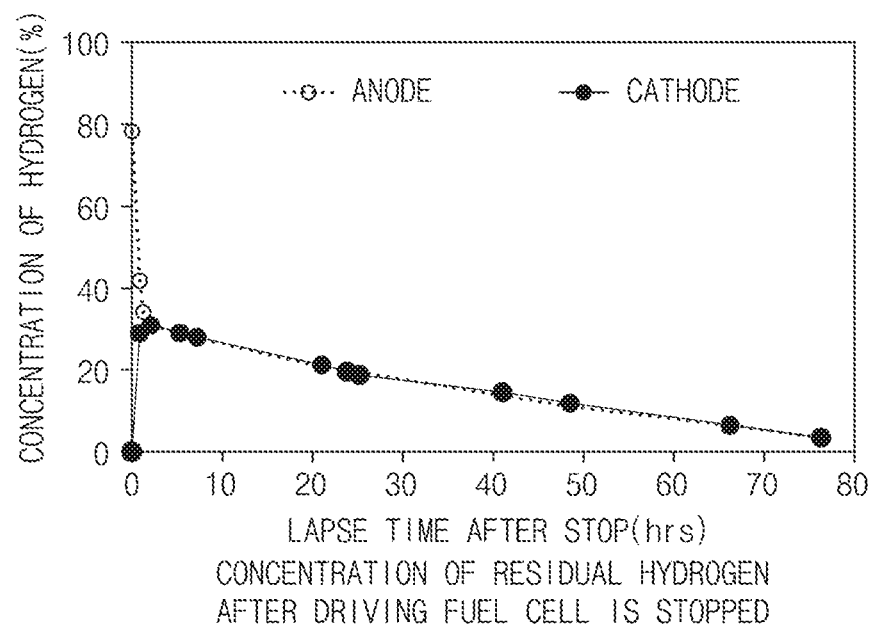
FIG. 7 is a graph depicting the concentration of residual hydrogen after driving of the fuel cell is stopped according to the exemplary embodiments of the present disclosure.

Referring to FIG. 7, it may be identified that the concentration of hydrogen that resides in the interior of the fuel cell system decreases as time elapses after the operation of the fuel cell system is stopped. When about 76 hours elapse after the driving of the fuel cell system is stopped, the concentration of residual hydrogen in the cathode (or the air electrode) may drop down to about 4% or less.

The controller 300 may be configured to set voltages that are to be applied to the fuel cell stack 100 (S1200). In other words, the controller 300 may be configured to set voltages that are to be applied to the cathode 110 and the anode 120. The controller 300 may further be configured to set voltages that are to be applied to the fuel cell stack such that a difference of the voltages applied to the cathode 110 and the anode 120 is less than a minimum voltage at which an electrolysis of water is generated. The difference between the voltages applied to the cathode 110 and the anode 120 becomes the minimum voltage (e.g., about 1.23 V) or greater at which an electrolysis of water is generated, an electrolysis may be generated in the cathode 110 to increase the concentrations of oxygen and hydrogen.

Referring to FIG. 5, the controller 300 may be configured to determine the concentration of the hydrogen in the cathode first to set voltages that are to be applied to the fuel cell stack (S1210). The controller 300 may be configured to acquire information regarding the concentration of hydrogen from a hydrogen concentration measuring unit or sensor (not illustrated) configured to directly measure the concentration of hydrogen in the cathode 110. Further, the controller 300 may be configured to estimate the concentration of hydrogen in the cathode 110 or acquire information regarding the concentration of hydrogen from a sensor.

The controller 300 may be configured to determine the concentration of hydrogen of the cathode 110 based on a lapse time from a time point at which the driving of the fuel cell system is stopped to a time point at which the fuel cell system is operated again. For example, the controller 300 may be configured to estimate the concentration of hydrogen in the cathode based on a hydrogen concentration table stored in the memory of the controller based on a lapse time. The hydrogen concentration table according to a lapse time may be represented as in the graph of FIG. 7.

Further, the controller 300 may be configured to determine an amount of hydrogen that will flow from the cathode 110 to the anode 120 based on a target concentration of hydrogen in the cathode 110, and the concentration of hydrogen in the cathode 110 before the voltages are applied and a volume of the cathode 110 (S1220). That is, the volume within the cathode. The amount of flowing hydrogen may be defined as an amount of hydrogen that will flow from the cathode 110 to the anode 120 through the electrolyte membrane by applying voltages to the cathode 110 and the anode 120. The amount of flowing hydrogen may be obtained as in Equation 1.

$$\{\text{Concentration of hydrogen in cathode (\%)} - \text{Target concentration of hydrogen (\%)}\} * (\text{Volume of cathode } (L)) = \text{Amount of flowing hydrogen } (L) \quad \text{Equation 1}$$

For example, when the concentration of hydrogen in the cathode 110 before the voltages are applied is 30%, a target concentration of hydrogen is 5%, and the volume of the cathode 110 is 4 L, the amount of flowing hydrogen may be calculated as 1 L according to Equation 1.

Furthermore, the controller 300 may be configured to set voltages that are to be applied to the fuel cell stack 100 based on the calculated amount of flowing hydrogen and a flowing hydrogen amount-applied voltage table stored in advance (S1230). The flowing hydrogen amount-applied voltage table may be experimentally obtained, and the applied voltages may change based on the amount of flowing hydrogen (or the amount of hydrogen to be pumped), the number of cells of the fuel cell stack 100, and a period of time for which the voltages are applied.

Figure 8:
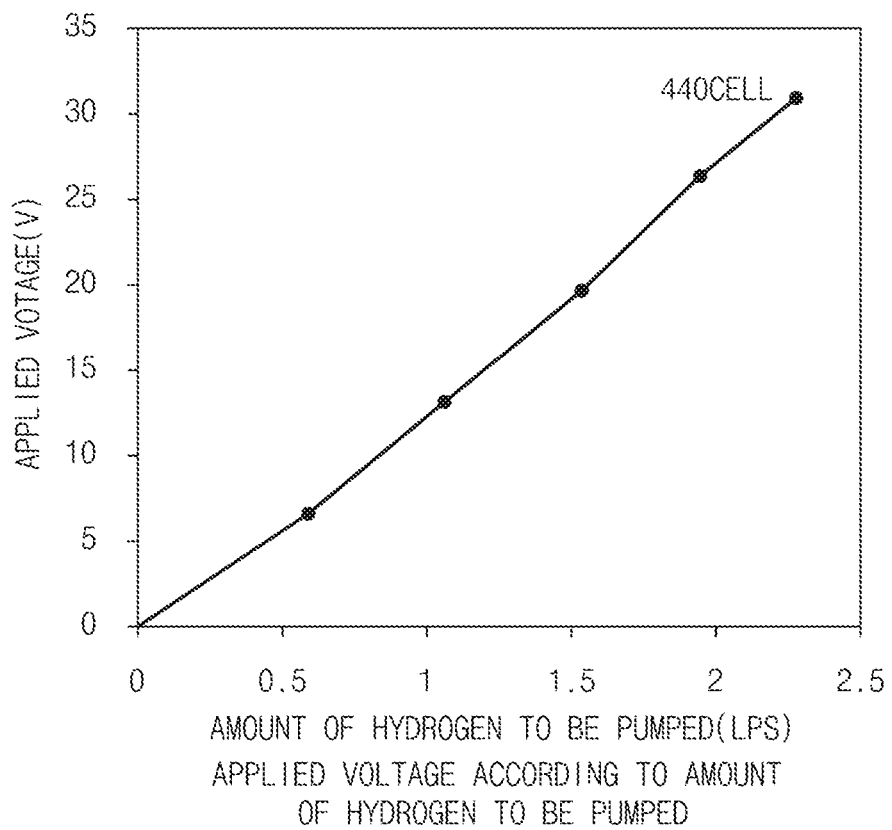
FIG. 8 is a graph depicting voltages that are to be applied according to the amount of hydrogen to be pumped according to the exemplary embodiments of the present disclosure.

FIG. 8 is a graph illustrating an applied voltage V based on an amount of hydrogen to be pumped (liter per second, LPS) when the number of cells of the fuel cell stack 100 is 440 and the period of time for which the voltage is applied is 1 second. Referring to FIG. 8, the applied voltage is set to be higher as the amount of hydrogen to be pumped (or the amount of flowing hydrogen) increases. In other words, as the amount of hydrogen that flows from the cathode 110 to the anode 120 increases, the magnitude of the voltages applied to the cathode 110 and the anode 120 may be set to be higher. For example, to move hydrogen of 1 L from the cathode 110 to the anode 120, a voltage of 13 V may be applied for 1 second.

Moreover, different from the description related to FIG. 5, the controller 300 may be configured to set voltages that are to be applied to the cathode 110 and the anode 120, based on a lapse time from a time point at which the driving of the fuel cell system is stopped to a time point at which the fuel cell system is operated again. In other words, the controller 300 may be configured to set an applied voltage based on a lapse time and an applied voltage table based on a lapse time stored in advance without separately determining the concentration of hydrogen.

The concentration of hydrogen in the cathode 110 may be estimated as described above at the lapse time, and the amount of flowing hydrogen may be obtained by obtaining the concentration of hydrogen in the cathode 110 since the target concentration of the hydrogen and the volume of the cathode 110 are fixed values. The applied voltage may be calculated using the amount of flowing hydrogen, the number of cells of the fuel cell stack, and the period of time for application of a voltage, and the number of cells of the fuel cell stack and the period of time for the application of the voltage may be fixed. Accordingly, the controller 300 may be configured to set an applied voltage based on a lapse time.

Accordingly, an applied voltage may be set using the lapse time without requiring using separate information regarding the concentration of hydrogen or the amount of flowing hydrogen in the cathode 110. The controller 300 may be configured to apply a set applied voltage to the cathode 110 and the anode 120 (S1300). In particular, the controller 300 may be configured to apply voltages to the cathode 110 and the anode 120 for a preset period of time by operating the relays 410 and 420 to cause a current to flow from the energy storage 200 to the fuel cell stack 100.

Thereafter, the controller 300 may be configured to operate the relays 410 and 420 to cause a current to flow from the fuel cell stack 100 to the energy storage 200. The energy storage 200 may include a first energy storage and a second energy storage. The second energy storage may have a voltage that is greater than that of the first energy storage.

To produce electric power by operating the fuel cell system, the controller 300 may be configured to adjust valves such that air containing oxygen is supplied to the cathode 110 and hydrogen is supplied to the anode 120 (S1400). The controller 300 may be configured to stop a supply of oxygen into the fuel cell stack 100 and a supply hydrogen to the cathode 110 in response to receiving a driving stop signal for stopping driving of the fuel cell system.

When the operation of the fuel cell system is stopped, the discharge lines of the cathode 110 and the anode 120 may be closed and thus, gases such as air or hydrogen remain within the cathode 110 and the anode 120. In particular, when oxygen remains in the fuel cell stack 100, carbon corrosion occurs, thus deteriorating the durability of the fuel cell stack 100. Accordingly, to reduce the concentration of oxygen that remains in the fuel cell stack 100, supply of oxygen may be stopped first and hydrogen may then be additionally supplied before the driving of the fuel cell system is stopped.

According to the above-described control method, the concentration of oxygen in the interior of the fuel cell stack 100 may be reduced without using a separate cathode oxygen depletion (COD) device and the concentration of oxygen in the interior of the fuel cell stack 100 may be effectively reduced using a separate COD device together.

Moreover, the fuel cell vehicle including the fuel cell system according to the present exemplary embodiments may include a fuel cell stack 100 operated by a fuel containing hydrogen, an energy storage 200 that may be charged or discharged, a controller 300, relays 410 and 420 that interrupt connections of elements in the interior of the fuel cell system, wheels (not illustrated) that are rotated by a power source, a driving motor 610 supplied with electric power from the fuel cell stack 100 or the energy storage 200 to be driven and rotate the wheels, and a steering input device (not illustrated) configured to adjust a travel direction of the vehicle. The wheels, the driving motor, and the steering input device of the vehicle are well known to those of skilled in the art, and thus, a detailed description thereof will be omitted.

The fuel cell stack 100 may include an electrolyte membrane and an anode and a cathode that are a pair of electrodes disposed on opposite sides of the electrolyte membrane. The controller 300 may be configured to supply voltages to the cathode and the anode to reduce the concentration of hydrogen of the cathode 110 before hydrogen that will operate the fuel cell stack 100 is supplied to the anode 120. When voltages are applied to the cathode 110 and the anode 120, hydrogen that remains in the cathode 110 may flow to the anode 120 through the electrolyte membrane.

The fuel cell system according to the present disclosure may reduce the concentration of hydrogen in the cathode by moving hydrogen that remains in the cathode to the anode through the electrolyte membrane through a method for applying voltages to the cathode and the anode before the hydrogen that will operate the fuel cell stack is supplied to the anode or the like.

Although the present disclosure has been described with reference to the limited exemplary embodiments and drawings, the present disclosure is not limited thereto and it is apparent that the embodiments of the present disclosure may be variously carried out by those skilled in the art without departing from the technical spirit of the present disclosure and the equivalent scopes of the claims that will be described below.

What is claimed is:

1. A fuel cell system, comprising:
   a fuel cell stack including an electrolyte membrane, and
      a cathode and an anode that are a pair of electrodes disposed on opposite sides of the electrolyte membrane; and
   a controller configured to apply a positive (+) voltage to the cathode and apply a negative (−) voltage to the anode before hydrogen that operates the fuel cell stack is supplied to the anode,
   wherein when the voltages are applied to the cathode and the anode, hydrogen that resides in the cathode flows to the anode through the electrolyte membrane to decrease the concentration of the hydrogen in the cathode.

2. The fuel cell system of claim 1, wherein the controller is configured to determine whether voltages are to be applied to the fuel cell stack, based on a lapse time from a time point at which an operation of the fuel cell system is stopped to a time point at which the fuel cell system is operated again.

3. The fuel cell system of claim 2, wherein the controller is configured to apply voltages to the fuel cell stack when the lapse time is less than a preset threshold period of time.

4. The fuel cell system of claim 1, wherein the controller is configured to set voltages to be applied to the fuel cell stack such that a voltage difference between the cathode and the anode is less than a minimum value of voltage at which electrolysis of water occurs.

5. The fuel cell system of claim 1, wherein the controller is configured to set the voltages that are to be applied to the cathode and the anode, based on the concentration of hydrogen in the cathode before the voltages are applied to the cathode.

6. The fuel cell system of claim 1, wherein the controller is configured to set an amount of voltage to be applied to the cathode and the anode, based on a lapse time from a time point at which driving of the fuel cell system is stopped to a time point at which the fuel cell system is operated again.

7. The fuel cell system of claim 1, wherein the controller is configured to set an amount of voltage to be applied to the fuel cell stack, based on the amount of hydrogen to be moved from the cathode to the anode and based on a pre-stored table including flowing hydrogen amount-applied voltage.

8. The fuel cell system of claim 7, wherein the controller is configured to determine the amount of hydrogen to be moved from the cathode to the anode, based on a target concentration of hydrogen in the cathode, and the concentration of hydrogen in the cathode before the voltages are applied and a volume of the cathode.

9. The fuel cell system of claim 8, wherein the controller is configured to determine the concentration of hydrogen in the cathode before the voltages are applied, based on a lapse time from a time point at which driving of the fuel cell system is stopped to a time point at which the fuel cell system is operated again.

10. The fuel cell system of claim 1, further comprising:
    an energy storage configured to apply the positive (+) voltage to the cathode and apply the negative (−) voltage to the anode.

11. The fuel cell system of claim 10, further comprising:
    a relay configured to switch connection of a positive (+) electrode of the energy storage and the cathode and switch connection of a negative (−) electrode of the energy storage and the anode,
    wherein the controller is configured to operate the relay to cause a current to flow from the fuel cell stack to the energy storage after applying voltages to the cathode and the anode for a preset period of time by operating the relay to cause a current to flow from the energy storage to the fuel cell stack.

12. The fuel cell system of claim 10, wherein the energy storage includes:
    a first energy storage; and a second energy storage having a voltage greater than that of the first energy storage.

13. The fuel cell system of claim 12, wherein:
the fuel cell system includes a relay configured to switch connection of a positive (+) electrode of the first energy storage and the cathode and switch connection of a negative (−) electrode of the first energy storage and the anode, and
the controller is configured to operate the relay to cause a current to flow from the fuel cell stack to the second energy storage after applying voltages to the cathode and the anode for a preset period of time by operating the relay to cause a current to flow from the first energy storage to the fuel cell stack.

14. The fuel cell system of claim 1, wherein the controller is configured to stop supply of oxygen into the fuel cell stack and supply hydrogen to the cathode in response to receiving a driving stop signal for stopping driving of the fuel cell system.

15. A method for controlling a fuel cell system, comprising:
applying, by a controller, a positive (±) voltage to a cathode of a fuel cell stack and a negative (−) voltage to an anode of the fuel cell stack to move hydrogen from the cathode to the anode; and
supplying, by the controller, a fuel containing hydrogen to the fuel cell stack to operate the fuel cell stack.

16. The method of claim 15, further comprising:
determining, by the controller, an amount of voltage to be applied to the cathode and the anode, based on at least one selected from the group consisting of: the concentration of hydrogen in the cathode before the voltages are applied, a lapse time from a time point at which driving of the fuel cell system is stopped to a time point at which the fuel cell system is operated again, or the amount of hydrogen that is to be moved from the cathode to the anode.

17. A fuel cell vehicle, comprising:
a fuel cell stack including an electrolyte membrane, and a cathode and an anode that are a pair of electrodes disposed on opposite sides of the electrolyte membrane; and
a controller configured to apply a positive (+) voltage to the cathode and apply a negative (−) voltage to the anode to reduce the concentration of hydrogen in the cathode before hydrogen that operates the fuel cell stack is supplied to the anode,
wherein hydrogen moves from the cathode to the anode through the electrolyte membrane when the voltages are applied to the cathode and the anode.

* * * * *